Patented July 22, 1941

2,250,098

UNITED STATES PATENT OFFICE 2,250,098

PROCESS OF PREPARING WATER-CONTAINING DYESTUFF PREPARATIONS OF HIGH CONCENTRATION

Albin Hardt and Albert Funke, Frankfort-on-the-Main, and Hermann Köcher, Dessau-Haideburg, Anhalt, Germany, assignors to General Aniline & Film Corporation, a corporation of Delaware No Drawing. Application August 3, 1938, Serial No. 222,808. In Germany August 3, 1937

13 Claims. (Cl. 8—76)

The present invention relates to dyestuff preparations, especially to pigment dyestuff preparations; it more particularly relates to water-containing dyestuff preparations of high concentration and to a process of preparing them. These products are very valuable in the manufacture of paintings, for dyeing rubber and plastics and for other technical purposes.

It is known that in the manufacture of a great number of dyestuffs, especially in the manufacture of pigment dyestuffs, there are obtained from the aqueous suspension press cakes having a proportionately small content of solid matter.

We have found that the dyestuff content of the press cakes may considerably be enhanced by adding to the aqueous suspension of the dyestuff, or already during the formation of the dyestuff, a fluid compound insoluble or difficultly soluble in water selected from the aliphatic or iso-cyclic series, for instance, an aliphatic or cyclic hydrocarbon or a substitution product thereof, such as hexane, benzene, chlorobenzene, xylene, chloronaphthalene or a fatty oil or a corresponding fatty acid, a terpene alcohol, an ester etc. or also a mixture of such compounds.

There may not only be used volatile liquids, but also high-molecular substances, such as hydrocarbon oils or fatty oils which remain in the finished dyestuff preparation. In some cases, stirring of the additional substances with the dyestuff suspensions is sufficient for obtaining, after pressing, concentrated dyestuff pastes which contain considerably less water than preparations obtained by merely pressing. In many cases there are even obtained, in this simple manner, products having a pulverulent consistency still containing, however, water. These water-containing dyestuff preparations of high concentration are from the technical point of view superior, in many respects, to the pastes of lower concentration. They may directly be worked up with varnishes, without the intermediate use of a kneader, for instance, on a cylinder support. It is remarkable that the dyestuffs contained in the preparations are not unfavorably influenced, by drying, with regard to their physical structure. In virtue of their high content of dyestuff the preparations may directly be used for dyeing rubber and other plastics, whereas the pastes of lower percentage can not directly be incorporated, on a commercial scale, with the material to be dyed. The present process is concerned with the manufacture of water-containing dyestuff preparations, it is, however, not the purpose of the present process to produce oil suspensions of pigment dyestuffs such as are obtained by addition of large amounts of oil, the water being then entirely removed.

The process of the present invention can generally be applied to pigment dyestuffs, especially azo-dyestuffs which are insoluble or difficultly soluble in water, with salts of basic or acid dyestuffs, inorganic pigments, in particular lead compounds, as well as with indigoid or anthraquinoid vat-dyestuffs. By treating the aqueous suspension of the dyestuff as above described, the water which is, otherwise, very firmly connected with the suspension, is removed to a considerable degree. It is, for instance, possible to remove, by means of 25 cc. of hexane, from 0.5 kg. of a paste of 21.85% strength of the dyestuff 4 - chloro - 2 - nitraniline→acetacetic acid-orthochloranilide such an amount of water that the remaining preparation contains 60% of the dyestuff.

The separation of a large amount of water is already obtained by merely uniting the additional substances with the aqueous dyestuff suspensions. Dyestuff preparations of particularly high concentration are obtained by intimately mixing both components in suitable devices.

We have, furthermore, found that the above-described process may be modified by applying the fluid compounds in an emulsified form. Such method of working has the advantage that the additional substances are brought to the dyestuff particles in a finely divided form, their action being thus more intensive.

The emulsification of the fluid compounds in water can be effected, by mechanical treatment, by well stirring them in suitable machines, the use of emulsifying agents being optional. Emulsifying agents suitable for the above named hydrocarbons and their substitution products, for instance, fatty acids, terpene alcohols, esters etc. and the mixtures thereof, are all known agents yielding emulsions with these products without unfavorably influencing the dyestuff. Among the great number of emulsifying agents which come into consideration for this purpose there may be named, as examples, lignite- and mineral oil sulfonates, alcohol sulfonates, fatty acid condensation products, such as oxethane-sulfonates, acyl-taurine, sulfonated aromatic hydrocarbons, such as isopropyl-naphthalene-sulfonic acid, sulfonated oils and fats, polyoxalkyl ethers of phenols carrying side chains or of alcohols, furthermore soaps and other compounds of surface action. The emulsifying agent which is most suitable for the respective dyestuff may easily be ascertained by a preliminary test. It is not essential that very stable emulsions are formed by this process, but it may in many cases even be desirable that the emulsion rapidly separates after the reaction has occurred. In some cases, it has proved advantageous to use emulsions consisting of mixtures of various hydrocarbons or oils one part of which has a specific gravity higher than water, the specific gravity of the other part being less than that of water.

In most cases, the effect of the emulsion sets in immediately when it is added. The coupling liquor becomes evidently more thinly liquid and the time necessary for pressing it corresponds to one half or one third of that required before; a press cake is thus obtained which may be washed on the suction filter or on the filter press in a considerably smaller period of time and which can also be dried more rapidly than without the addition of the above substances. This method of working requires only very small amounts of the additional substances. It is, of course, also possible to add the emulsion, with good success, to the finished press cake, but a special advantage of the use of emulsions resides in the fact that they are effective in every case, independently of differences as regards the specific gravity of the dyestuff and that of the addition, especially also in case dyestuff liquors having a small content of dyestuff or of solid matter are used.

The following examples serve to illustrate the invention, but they are not intended to limit it thereto; the parts are by weight:

1. 25 cc. of hexane are added, in a kneading apparatus, to 500 parts of a paste of 20 per cent. strength of the dyestuff 4-chloro-2-nitraniline→acetacetic acid-ortho-chloranilide. After a short time, from the paste, which initially was homogeneous, water has separated to such a degree, that a large amount of the water can be removed by pressing. The preparation thus obtained contains 60% of the dyestuff.

2. 20 cc. of xylene are added to a suspension of 170 parts of the dyestuff 4-chloro-2-nitraniline→acetacetic acid-ortho-chloranilide in 2500 parts of water. The dyestuff preparation obtained after separating contains 42% of the dyestuff.

3. 25 cc. of hexane are added to 500 parts of a paste of 21.7% strength of the dyestuff 3-nitro-4-toluidine→acetacetic acid anilide. After a short time, the water which separates can be removed; the preparation contains 60% of the dyestuff.

4. An aqueous suspension of 43.5 parts of acetacetic acid-ortho-chloranilide is mixed with 25 cc. of chloro-naphthalene and then combined as usual with a diazo solution from 34.5 parts of 4-chloro-2-nitraniline, in the presence of sodium acetate, to form the dyestuff. After pressing, the dyestuff preparation has a content of solid matter of 58.8%. A combination effected in the same manner without the above addition yields, on pressing, a paste of 28.8 per cent. strength.

5. 25 cc. of xylene are added, in a kneading apparatus, to 500 parts of a paste of 21.5 per cent. strength of the azo-dyestuff from 3-nitro-4-toluidine and beta-naphthol. From the homogeneous paste water separates; after removal of the water a preparation containing 51.2 per cent. of the dyestuff is obtained.

6. 250 parts of an aqueous paste of 20 per cent. strength of the disazo-dyestuff from 1 mol of ortho-dichloro-benzidine and 2 mols of phenyl-methyl-pyrazolone are intimately mixed with 2.5 parts of a mixture of terpene alcohols such as are, for instance, obtained in the manufacture of camphor. The paste which has become thinly liquid is filtered with suction. The residue on the filter contains 30% of solid matter.

7. 493 parts of a paste of 17.2 per cent. strength of the mono-azo-dyestuff from 2-amino-5-nitro-1-methoxybenzene coupled with 2.3-hydroxynaphthoic acid-alpha-naphthylamide are mixed, while kneading, with 15 grams of linseed oil. The paste which has become thinly liquid is filtered with suction. The residue obtained on the filter contains 25% of solid matter.

8. 350 parts of an aqueous paste of 18 per cent. strength of the mono-azo-dyestuff from meta-nitro-para-toluidine coupled with beta-naphthol are mixed, while kneading, with 12.6 parts of castor oil. The paste which has become thinly liquid is filtered with suction. The residue obtained on the filter has a dry content of 28%.

9. 1000 grams of a paste of 23.7 per cent. strength of the azo-dyestuff 2-aminotoluene-4-carboxylic acid-2'.4'-dimethylanilide → beta-hydroxynaphthoic acid-4-chlor-anilide are treated, in a kneader, with 95 cc. of a solution of 2.5 parts of paraffin wax in 97.5 parts of tetrachlor-ethane. A large amount of the water contained in the paste separates easily. The preparation obtained after removal of the water contains 71.7% of the dyestuff.

10. 36.5 kg. of the press cake of the azo-dyestuff 3-nitro-4-toluidine→acetacetic acid anilide containing 27.4% of the dyestuff are mixed, in a kneading apparatus, with 4.4 kg. of a mixture of benzine and benzene containing 10% of benzene. The water contained in the paste separates to a high degree and is removed. A water-containing preparation in powder-form containing 60% of the dyestuff is obtained.

11. 1500 grams of an aqueous paste of 18.4 per cent. strength of the dyestuff 5.5'-dichloro-6.6'-dimethyl-2.2'-bis-thionaphthene-indigo (Schultz, Farbstofftabellen 7th ed., vol. I, No. 1354) are mixed, in a kneading apparatus, with 110 cc. of a mixture of benzine and benzene containing 10% of benzene. After a short time, part of the water separates; after stirring for a prolonged period of time, about 600 cc. of water can be separated. The pulverulent preparation which remains contains 33.5% of the dyestuff.

12. (a) 1000 cc. of a fresh coupling liquor of an azo-dyestuff from amino-azotoluene and beta-naphthol with a dry content of 1.5% are filtered on the suction filter. About 73 grams of a press cake containing 22% of solid material are obtained.

(b) An emulsion of 8.0 cc. of xylene with a solution of 0.4 gram of sodium iso-propyl-naphthalene-sulfonate in 4.0 cc. of water is added, while stirring, to 1000 cc. of the above coupling liquor containing 1.5% of solid material. After filtering with suction or pressing, about 30 grams of a press cake containing about 50% of solid material are obtained. The dry content is thus increased from 22% to 50%.

13. (a) Without additions: 1000 cc. of a fresh coupling liquor of an azo-dyestuff from para-phenetidine and alpha-naphthol containing 2.0% of solid material are pressed without any further additions; about 94 grams of a press cake having a dry content of 21.6% are thus obtained.

(b) With carbon tetrachloride in an emulsified form an emulsion from 5.6 cc. of carbon tetrachloride and a solution of 0.28 gram of sodium iso-propyl-naphthalene-sulfonate in 4.4 cc. of water, mixed before used with 100 cc. of water, is added, while stirring, to 1000 cc. of a fresh coupling liquor of the above azo-dyestuff having the same dry content, and the whole is filtered with suction or pressed, after a 30 minutes' stirring; about 53 grams of a press cake having a dry content of 43.0% are obtained.

The dry content thus increases from 21.6% to 43.0%.

14. (a) 1000 cc. of a coupling liquor of a disazo-dyestuff from aniline→alpha-naphthylamine→1.8-heptylene-diamine having a dry content of 1.8% are filtered with suction or pressed without any additions; various tests yielded about 86–88 grams of a press cake containing about 22% of solid material.

(b) An emulsion from 6.6 cc. of xylene and 0.4 gram of sodium isopropyl-naphthalene-sulfonate in 3.3 cc. of water, diluted before use with 100 cc. of water, is added, while stirring, to 1000 cc. of the same coupling liquor containing 1.8% of solid material; after a 2 hours' stirring, about 41 grams of a press cake having a dry content of 43% are obtained. An increase of the dry content from about 22% to 43% is thus obtained.

(c) An emulsion from 4.2 cc. of carbon tetrachloride and 0.2 gram of sodium iso-propyl-naphthalene-sulfonate in 2.3 cc. of water, which has been diluted before use with 100 cc. of water is added to 1000 cc. of a fresh coupling liquor of the same dyestuff having the same percentage; after a one hour's stirring, the whole is pressed, about 46 grams of a press cake containing about 50% of solid material being thus obtained.

The dry content is thus increased from 22% to 50%.

(d) An emulsion from 2.5 cc. of xylene, 2.5 cc. of carbon tetrachloride and a solution of 0.2 gram of sodium iso-propyl-naphthalene-sulfonate in 1.5 cc. of water, which has been diluted before use with 100 cc. of water, are added, while stirring for one hour, to 1000 cc. of a fresh coupling liquor having the same dry content as indicated under 14(a); after filtering or pressing, about 25.6 grams of a press cake having a dry content of 84% are obtained.

Increase of the dry content: from about 22% to 84%.

15. In an analogous manner, 1000 cc. of a coupling liquor of an azo-dyestuff from ortho-anisidine→betanaphthol having a dry content of 1.7%–1.8% yield the following press-cakes:

| Additions | Press-cake | Dry content |
|---|---|---|
| | Grams | Percent |
| (a) Without additions | 188.8 | 8.6 |
| (b) With an emulsion from 13.5 cc. of xylene and 0.65 gram of sodium isopropyl-naphthalene-sulfonate in 6.5 cc. of water | 67 | 24 |
| (c) With an emulsion from 11.2 cc. of carbon tetrachloride and 0.56 gram of sodium isopropylnaphthalene-sulfonate in 0.8 cc. of water | 62 | 26.4 |
| (d) With an emulsion from 2.5 cc. of xylene and 2.5 cc. of carbon tetrachloride, 0.2 gram of sodium isopropyl-naphthalene-sulfonate and 1.5 cc. of water | 50 | 36.1 |

16. 1000 cc. of a coupling liquor of an azo-dyestuff from xylidine→phenyl-methyl-pyrazolone having a dry content of about 5% yield the following press cakes:

| Additions | Press-cake | Dry content |
|---|---|---|
| | Grams | Percent |
| (a) Without additions | 296 | 17.2 |
| (b) With an emulsion from 2.7 cc. of xylene and 0.13 gram of sodium isopropyl-naphthalene-sulfonate in 1.3 cc. of water | 140 | 36.8 |
| (c) As indicated under 15 (c) | 121.3 | 41.2 |
| (d) As indicated under 15 (d) | 96 | 49.4 |

17. 10 grams of castor oil are, by means of a rapid stirrer, finely divided in 100 cc. of water and the emulsion thus obtained is added, while continuously stirring, to a suspension of 100 grams of the coupling product from 3-nitro-4-toluidine and beta-naphthol in 1 liter of water which is, likewise, mechanically stirred. The product is filtered with suction; the residue on the filter has a content of 25% of the dyestuff.

We claim:

1. The process of producing water-containing dyestuff preparations of high concentration, which comprises adding to a suspension of the dyestuff in water fluid compounds in a small quantity not sufficient to break the suspension selected from the group consisting of water-insoluble and difficultly water-soluble compounds of the aliphatic and isocyclic series and mixtures of such compounds, mixing intimately, and removing the excess water mechanically whereby the high concentration dyestuff is obtained.

2. The process of producing water-containing dyestuff preparations of high concentration, which comprises adding to the liquid wherein the dyestuff is produced fluid compounds in a small quantity not sufficient to break the suspension selected from the group consisting of water insoluble and difficultly water-soluble compounds of the aliphatic and isocyclic series and mixtures of such compounds, mixing intimately, and removing the excess water mechanically whereby the high concentration dyestuff is obtained.

3. The process of producing water-containing dyestuff preparations of high concentration, which comprises adding to a suspension of the dyestuff in water, after having drained off the liquor wherein the dyestuff has been produced, fluid compounds in a small quantity not sufficient to break the suspension selected from the group consisting of water insoluble and difficultly water-soluble compounds of the aliphatic and isocyclic series and mixtures of such compounds, mixing intimately, and removing the excess water mechanically whereby the high concentration dyestuff is obtained.

4. The process of producing water-containing dyestuff preparations of high concentration, which comprises adding to a suspension of the dyestuff in water fluid compounds in a small quantity not sufficient to break the suspension emulsified in water selected from the group consisting of water-insoluble and difficultly water-soluble compounds of the aliphatic and isocyclic series and mixture of such compounds, mixing intimately, and removing the excess water mechanically whereby the high concentration dyestuff is obtained.

5. The process of producing water-containing dyestuff preparations of high concentration, which comprises adding to a suspension of the dyestuff in water fluid compounds in a small quantity not sufficient to break the suspension emulsified in water by means of capillary-active substances, the fluid compounds being selected from the group consisting of water-insoluble and difficultly water-soluble compounds of the aliphatic and isocyclic series and mixtures of such compounds, mixing intimately, and removing the excess water mechanically whereby the high concentration dyestuff is obtained.

6. The process of producing water-containing dyestuff preparations of high concentration, which comprises adding to a suspension of the dyestuff in water fluid compounds in a small quantity not sufficient to break the suspension emulsified in water by means of the sodium salt of iso-propyl napthalene-sulfonic acid, the fluid compounds being selected from the group consisting of water-insoluble and difficultly water soluble compounds of the aliphatic, and isocyclic series and mixtures of such compounds, mixing intimately, and removing the excess water mechanically whereby the high concentration dyestuff is obtained.

7. The process of producing water-containing dyestuff preparations of high concentration, which comprises adding to a suspension of the dyestuff in water a mixture of fluid compounds in a small quantity not sufficient to break the suspension emulsified with water composed of substances partially of higher and partially of smaller specific gravity than water, the fluid compounds being selected from the group consisting of water-insoluble and difficultly water-soluble compounds of the aliphatic and isocyclic series and mixtures of such compounds, mixing intimately, and removing the excess water mechanically whereby the high concentration dyestuff is obtained.

8. The process of producing water-containing dyestuff preparations of high concentration which comprises adding to a suspension of the dyestuff a mixture of benzine and benzene containing about 10% of benzene in a small quantity not sufficient to break the suspension, mixing intimately, and removing the excess water mechanically whereby the high concentration dyestuff is obtained.

9. The process of producing water-containing dyestuff preparations of high concentration which comprises adding to a suspension of the dyestuff tetrachlorethane in a small quantity not sufficient to break the suspension, mixing intimately, and removing the excess water mechanically whereby the high concentration dyestuff is obtained.

10. The process of producing water-containing dyestuff preparations of high concentration which comprises adding to a suspension of the dyestuff castor oil in a small quantity not sufficient to break the suspension, mixing intimately, and removing the excess water mechanically whereby the high concentration dyestuff is obtained.

11. The process of producing water-containing dyestuff preparations of high concentration, which comprises adding to a suspension of 5,5'-dichloro-6,6'-dimethyl-2,2' - bis-thionaphthene - indigo a mixture of benzine and benzene containing about 10% of benzene in a small quantity not sufficient to break the suspension, mixing intimately and removing the excess water mechanically whereby the high concentration dyestuff is obtained.

12. The process of producing water-containing dyestuff preparations of high concentration, which comprises adding to a suspension of the azo-dyestuff 2-aminotoluene-4-carboxylic acid-2',4'-dimethylanilide→beta - hydroxy - naphthoic acid-4-chloranilide-tetrachlorethane in a small quantity not sufficient to break the suspension, mixing intimately, and removing the excess water mechanically whereby the high concentration dyestuff is obtained.

13. The process of producing water-containing dyestuff preparations of high concentration, which comprises adding to a suspension of the azo-dyestuff meta-nitro - para - toluidine→beta-napthol castor oil in a small quantity not sufficient to break the suspension, mixing intimately, and removing the excess water mechanically whereby the high concentration dyestuff is obtained.

ALBIN HARDT.
ALBERT FUNKE.
HERMANN KÖCHER.